United States Patent [19]

Baeza et al.

[11] Patent Number: 4,854,568
[45] Date of Patent: Aug. 8, 1989

[54] UNIVERSAL ANGLE V-BLOCK WORK HOLDING FIXTURE

[76] Inventors: Sam Baeza, 156 Juanita; Hector Pulido, 8764 Winchester, both of El Paso, Tex. 79907

[21] Appl. No.: 196,504

[22] Filed: May 20, 1988

[51] Int. Cl.4 ............................................. B25B 1/24
[52] U.S. Cl. ................................... 269/268; 269/277; 269/902
[58] Field of Search ......................... 409/219, 225, 903; 51/220, 216 R, 216 A, 217 R, 217 A; 408/72; 33/573; 269/902, 900, 271, 272, 268, 264, 277, 88, 296, 126–129

[56] References Cited

U.S. PATENT DOCUMENTS

| | | |
|---|---|---|
| D. 263,787 | 4/1982 | Testa et al. |
| 893,875 | 7/1908 | Schneider ........................ 269/902 |
| 1,054,740 | 3/1913 | Bach . |
| 1,071,289 | 8/1913 | Bader ............................... 269/902 |
| 1,802,914 | 4/1931 | Gruber ............................. 409/903 |
| 1,964,194 | 6/1934 | Coe . |
| 2,302,943 | 11/1942 | Haselwood . |
| 2,362,306 | 11/1944 | Ringzelli ............................ 51/220 |
| 2,364,150 | 12/1944 | Lowenstein ...................... 409/225 |
| 2,371,831 | 3/1945 | Leming ............................. 269/902 |
| 2,385,902 | 10/1945 | Wilson .............................. 51/220 |
| 2,409,936 | 10/1946 | Hunt ................................. 269/268 |
| 2,718,104 | 9/1955 | Kirklin .............................. 51/220 |
| 3,218,059 | 11/1965 | Andrew ............................ 269/271 |
| 3,463,478 | 8/1969 | Hennessy . |
| 3,967,816 | 7/1976 | Ramsperger et al. ............ 269/900 |
| 4,139,189 | 2/1979 | Wietrzyk .......................... 269/902 |
| 4,221,391 | 9/1980 | Dutton . |
| 4,465,268 | 8/1984 | Hudson ............................ 269/902 |

*Primary Examiner*—Robert C. Watson
*Attorney, Agent, or Firm*—Leon Gilden

[57] ABSTRACT

A universal angle V-block fixture enables machine operations to be performed on cylindrical work pieces at a variety of predetermined angles. The fixture includes two mirror symmetrical hepagonal blocks, each provided with a pair of V-grooves in opposed faces thereof. Each block has seven flat sides which intersect at various included angles. By positioning a cylindrical work piece in facing V-grooves of each block, the work piece may be oriented by turning the block to orient the longitudinal axis of the work piece at 0, 15, 30, 45, 60, and 90 degrees with respect to a horizontal reference. The V-groves in the opposed front and back faces of each block are formed of two different sizes for allowing a wide variety of different diameter work pieces to be clamped. The side faces of each block are provided with a central rectangular groove for providing an accurate flat surface for cooperation with work holding fixtures of various machine tools.

3 Claims, 3 Drawing Sheets

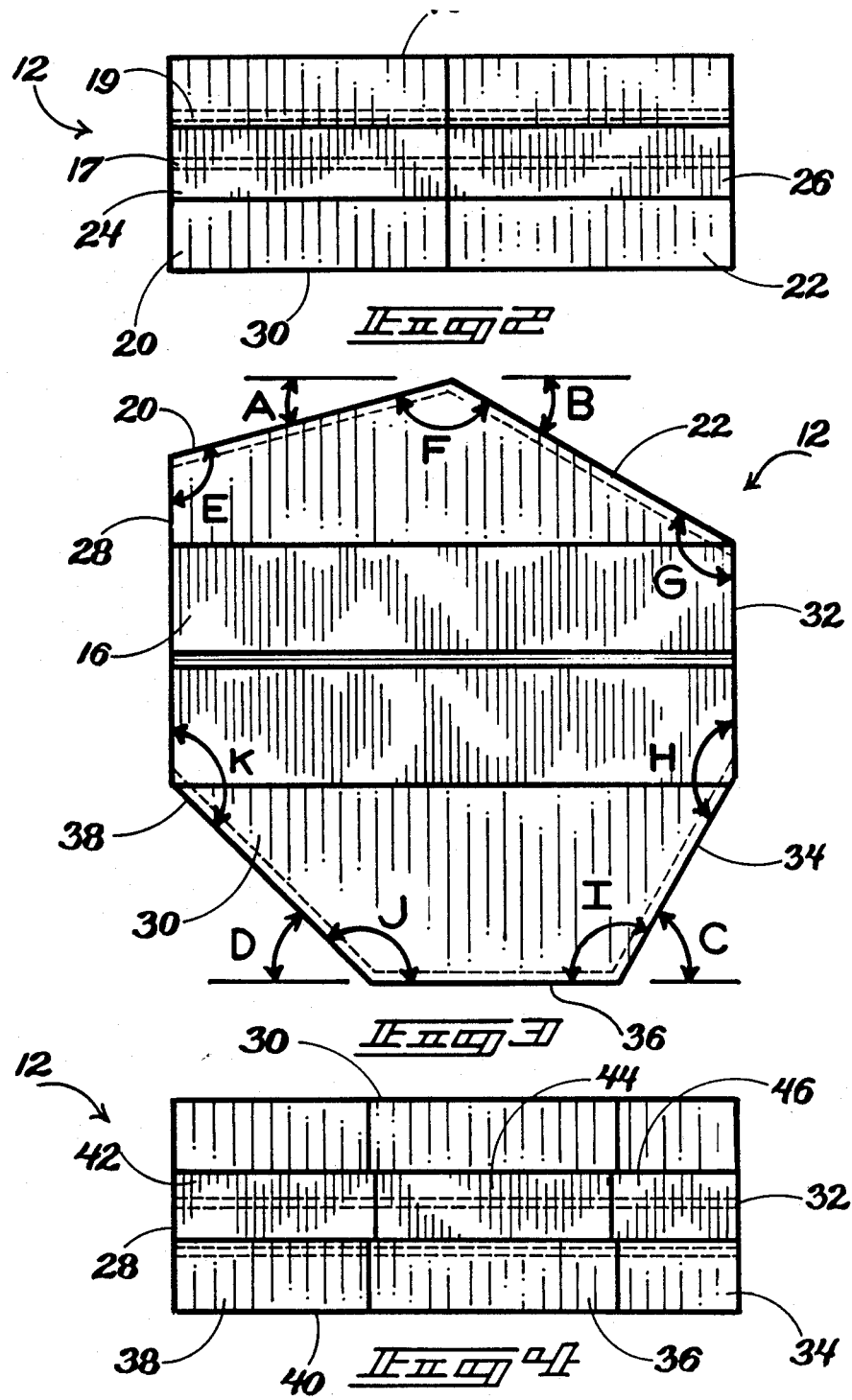

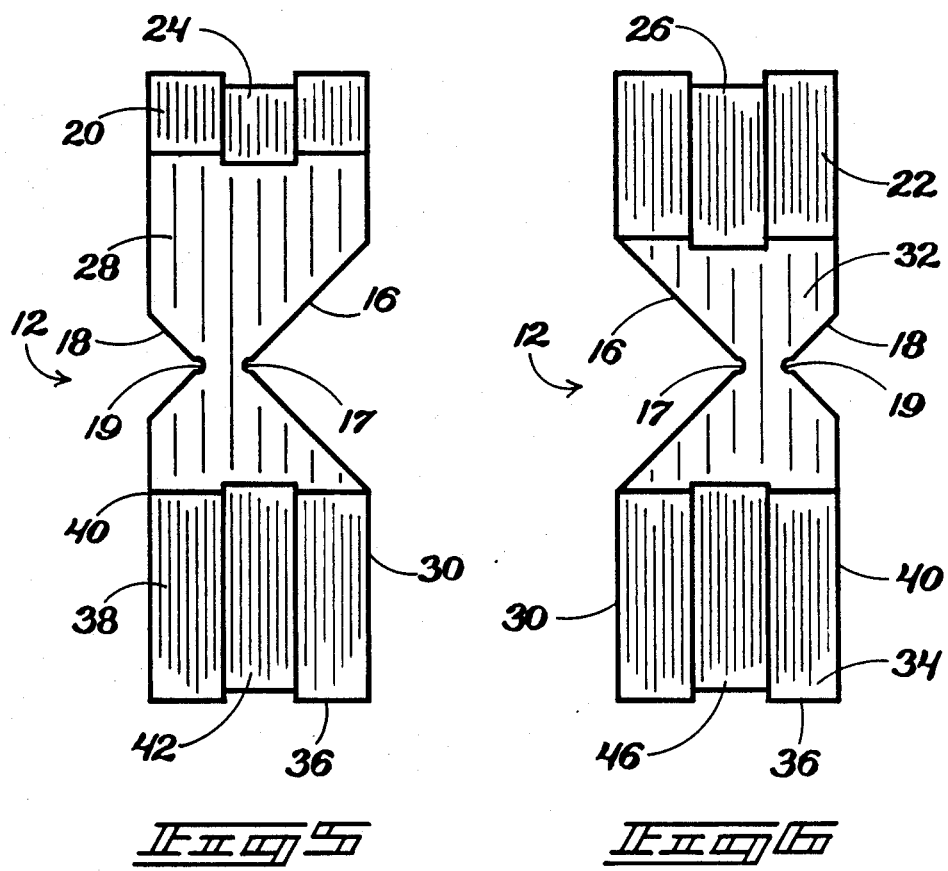

UNIVERSAL ANGLE V-BLOCK WORK HOLDING FIXTURE

BACKGROUND OF THE INVENTION

1. Field of the Invention

The present invention relates to work holding fixtures, and more particularly pertains to a new and improved V-block fixture which allows cylindrical work pieces to be oriented at a variety of different predetermined angles in the work holding fixture of a machine tool such as a drill press or milling machine. Frequently, it is necessary to drill or mill cylindrical work pieces at standard angles of fifteen, thirty, forty five, sixty or ninety degrees. Previously, it has been necessary to maintain a large inventory of work holding fixtures to allow these machining operations to be performed. Alternatively, extremely expensive angularly adjustable fixtures may be utilized. In order to provide a simple economical and effective work holding fixture for overcoming these problems, the present invention provides a pair of mirror symmetrical V-blocks to allow machining of cylindrical work pieces at a variety of predetermined angular orientations.

2. Description of the Prior Art

Various types of work holding fixtures are known in the prior art. A typical example of such a work holding fixture is to be found in U.S. Pat. No. Design 263,787, which issued to M. Testa et al on Apr. 13, 1982. This patent discloses a pipeholding vice jaw attachment which provides a V-block fixture having two different sizes of V-grooves. U.S. Pat. No. 1,054,740, which issued to A. Bach on Mar. 4, 1913, discloses a vice jaw attachment which includes a fixture block provided with a plurality of different geometrical configurations of grooves for holding a variety of work pieces. U.S. Pat. No. 1,964,194, which issued to J. Coe on June 26, 1934, discloses a work holding attachment for a vice which allows a cylindrical tube to be sawed in half. The fixture includes a one piece metal block having a circular opening formed therethrough to receive a length of pipe. The block has a slot extending longitudinally of the axis of the opening and extending from the outer side of the block to the opening. U.S. Pat. No. 2,302,943, which issued to G. Haselwood on Nov. 24, 1942, discloses a V-block attachment for holding a cylindrical work piece in a vice. U.S. Pat. No. 3,463,478, which issued to E. Hennessey on Aug. 26, 1969, discloses a fixture block having an array of circular apertures for receiving selectively positionable work supporting pegs. This allows various configurations of work pieces to be supported at desired orientations. U.S. Pat. No. 4,221,391, which issued to A. Dutton on Sept. 9, 1980, discloses a multiple segmented chuck jaw for holding a work piece for a machining operation. The device comprises a master jaw and a shaped insert provided with cooperating dove tail portions for detachably securing the master jaw and the shaped insert together.

While the above mentioned devices are suited for their intended usage, none of these devices provide a universal angle V-block work holding fixture which utilizes a pair of mirror symmetrical heptagonal blocks, each provided with a pair of different sized V-grooves on opposite faces thereof. Additionally, none of the aforesaid devices provide a work holding fixture capable of holding a cylindrical work piece at a variety of preselected angles for performing drilling or milling operations thereon. Inasmuch as the art is relatively crowded with respect to these various types of work holding fixtures, it can be appreciated that there is a continuing need for and interest in improvements to such work holding fixtures, and in this respect, the present invention addresses this need and interest.

SUMMARY OF THE INVENTION

In view of the foregoing disadvantages inherent in the known types of work holding fixtures now present in the prior art, the present invention provides an improved universal angle V-block work holding fixture. As such, the general purpose of the present invention, which will be described subsequently in greater detail, is to provide a new and improved universal angle V-block work holding fixture which has all the advantages of the prior art work holding fixtures and none of the disadvantages.

To attain this, a representative embodiment of the concepts of the present invention is illustrated in the drawings and makes use of two mirror symmetrical heptagonal blocks, each provided with a pair of V-grooves in opposed faces thereof. Each block has seven flat sides which intersect at various included angles. By positioning a cylindrical work piece in facing V-grooves of each block, the work piece may be oriented by turning the block to orient the longitudinal axis of the work piece at 0, 15, 30, 45, 60, and 90 degrees with respect to a horizontal reference. The V-grooves in the opposed front and back faces of each block are formed of two different sizes for allowing a wide variety of different diameter work pieces to be clamped. The side faces of each block are provided with a central rectangular groove for providing an accurate flat surface for cooperation with work holding fixtures of various machine tools.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved universal angle V-block work holding fixture which has all the advantages of the prior art work holding fixtures and none of the disadvantages.

It is another object of the present invention to provide a new and improved universal angle V-block work holding fixture which may be easily and efficiently manufactured and marketed.

It is a further object of the present invention to provide a new and improved universal angle V-block work holding fixture which is of a durable and reliable construction.

An even further object of the present invention is to provide a new and improved universal angle V-block work holding fixture which is susceptible of a low cost of manufacture with regard to both materials and labor, and which accordingly is then susceptible of low prices of sale to the consuming public, thereby making such work holding fixtures economically available to the buying public.

Still yet another object of the present invention is to provide a new and improved universal angle V-block work holding fixture which provides in the apparatuses and methods of the prior art some of the advantages thereof, while simultaneously overcoming some of the disadvantages normally associated therewith.

Still another object of the present invention is to provide a new and improved universal angle V-block work holding fixture for holding a cylindrical work piece at a variety of preselected angular orientations while performing machining operations thereon.

Yet another object of the present invention is to provide a new and improved universal angle V-block work holding fixture which includes a pair of mirror symmetrical heptagonal blocks having a plurality of planar angled side faces for orienting cylindrical work pieces at a variety of predetermined angular orientations.

Even still another object of the present invention is to provide a new and improved universal angle V-block work holding fixture which includes a pair of mirror symmetrical heptagonal blocks provided with different sized V-grooves on opposed faces thereof for supporting a wide variety of different sizes of cylindrical work pieces at a variety of predetermined angular orientations.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a top view of one of the V-blocks of the work holding fixture of the present invention.

FIG. 3 is a front view of the V-block of FIG. 2.

FIG. 4 is a bottom view of the V-block of FIG. 3.

FIG. 5 is a left side view of the V-block of FIG. 3.

FIG. 6 is a right side view of the V-block of FIG. 3.

DESCRIPTION OF THE PREFERRED EMBODIMENT

Figure 1:
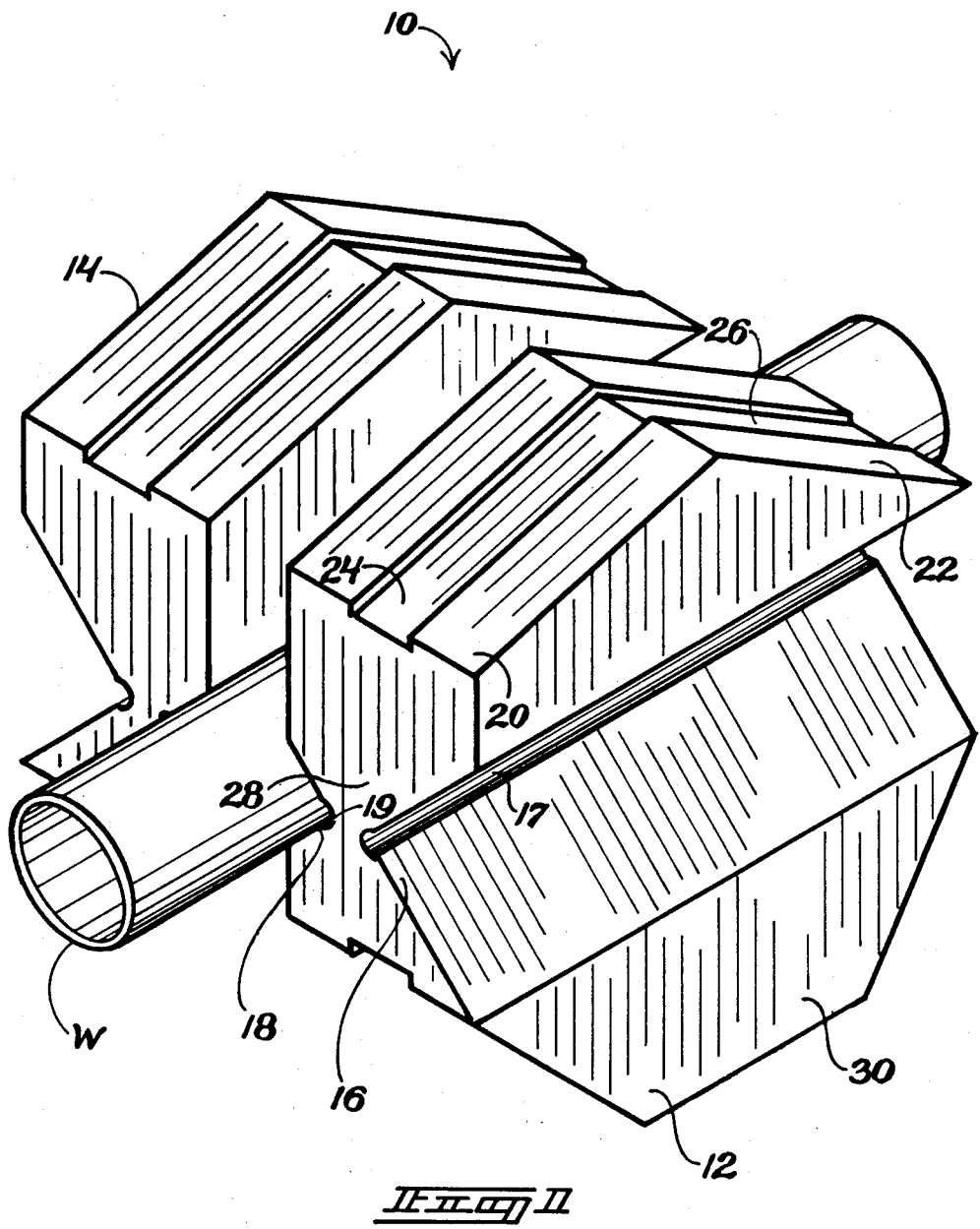
FIG. 1 is a perspective view of the universal angle V-block work holding fixture of the present invention.

With reference now to the drawings, and in particular to FIG. 1 thereof, a new and improved universal angle V-block work holding fixture embodying the principles and concepts of the present invention and generally designated by the reference numeral 10 will be described.

More specifically, it will be noted that the first embodiment 10 of the invention includes a pair of heptagonal blocks 12 and 14. The blocks 12 and 14 are identically formed, with the exception that the block 14 is mirror symmetrical to the block 12. In view of this symmetrical relationship, only the constructional details of the block 12 will be further described. In use, a cylindrical work piece W is positioned between facing V-groove portions of the blocks 12 and 14. The block 12 is provided with a first smaller depth V-groove 18 and a second larger depth V-groove 16. The dimensions of the V-grooves 16 and 18, and the overall dimensions of the block 12 may be selected as desired, depending upon the size of the work piece to be clamped. The V-groove 16 terminates in a radiused relief channel 17, and the V-groove 18 terminates in a similar radiused relief channel 19. As illustrated, the larger V-groove 16 is machined into the front face 30 of the block 12, and the smaller V-groove 18 is formed in opposed relation, machined into the back face of the block 12. The block 12 has seven side faces, which form various included angles with adjacent faces as will be further described subsequently.

In FIG. 2, a top view of the block 12 is provided. The side face 20 is a flat planar surface provided with a rectangular central groove 24. The side face 22 is a flat planar surface provided with a rectangular central groove 26. The block 12 has parallel planar front 30 and back 40 surfaces.

As shown in FIG. 3, the block 12 has seven planar side faces 20, 22, 32, 34, 36, 38 and 28. The side face 20 is inclined at an angle A of 15 degrees with respect to a horizontal reference. The side face 22 is inclined at an angle B of 30 degrees with respect to a horizontal reference. The side face 32 is perpendicular to a horizontal reference. The side face 34 forms an angle C of sixty degrees with respect to a horizontal reference. The side face 36 is parallel to a horizontal reference. The side face 38 forms an angle of 45 degrees with respect to a horizontal reference. The side face 28 is perpendicular to a horizontal reference and parallel to the side face 32. The longitudinal axis of the V-grooves 16 and 18 extend parallel to a horizontal reference and to the side face 36. Thus, when an elongated cylindrical work piece is clamped within the V-groove 16, the work piece will be oriented in a horizontal position when the side face 36 is in engagement with a horizontal reference surface of a machine tool platen. By rotating the fixture blocks 12 and 14 to a desired orientation, the longitudinal axis of the work piece may be oriented at preselected angles of 0, 15, 30, 45, 60 or 90 degrees with respect to a horizontal reference, by respectively placing one of the side faces 36, 20, 22, 38, 34 or 32 into engagement with the horizontal reference surface on the machine tool platen. Adjacent side faces of the heptagonal block 12 form included angles E of 105 degrees, F of 135 degrees, G of 120 degrees, H of 150 degrees, I of 120 degrees, J of 135 degrees, and K of 135 degrees. As may be readily understood, the preselected angular orientations available may be altered by appropriate selection of the included angles E through K. Thus, while the present invention has been described with reference to preselected angular orientations of 0, 15, 30, 45, 60 and 90 degrees, it may be readily understood that an infinite variety of angular orientations may be provided by appropriate selection of the angles E through K. Additionally, while the present invention has been described with reference to a heptagonal configured block, it is also considered within the scope of the present invention that an additional number of side faces may be provided to allow an increased number of available preselected angular orientations. Thus, for example, the blocks 12 and 14 may be provided with any number of sides above 5.

In FIG. 4, a bottom view of the block 12 is provided.

In FIG. 5, a left side view of the block 12 illustrated in FIG. 3 is provided.

In FIG. 6, a right side view of the block 12 illustrated in FIG. 3 is provided. As illustrated, the V-grooves 16 and 18 extend in parallel relation on opposed front 30 and back 40 faces of the block 12. The blocks 12 and 14 of the present invention may be formed from a variety of conventional materials such as wood, aluminum, plastic, steel, etc. The preferred construction material is a tool grade steel to provide a high degree of durability and accuracy.

The side faces 20, 22, 34, 36 and 38 are each provided with rectangular central grooves 24, 26, 46, 44 and 42, respectively. As previously mentioned, these rectangular grooves serve to allow engagement of the blocks 12 and 14 with conventional machine tool work holding fixtures and allow extremely accurate machined reference surfaces to be achieved.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved universal angle V-block work holding fixture for holding a cylindrical work piece at a variety of predetermined angular orientations during a machining operation, comprising:

a first block having parallel opposed front and back surfaces connected by at least five planar side surfaces;

at least one V-groove formed in one of said front and back surfaces;

and a second block having mirror symmetry with said first block, and wherein said first block has seven side surfaces, and wherein said first block is provided with two V-grooves extending in parallel relations, one formed in each of said front and back surfaces, and wherein said first block has seven side surfaces, said side surfaces forming angles with a horizontal reference of 15, 30, 90, 60, 0, 45 and 90 degrees.

2. The universal angle V-block work holding fixture of claim 1, wherein said seven side surfaces form included angles of 105, 135, 120, 150, 120, 135, and 135 degrees.

3. The universal angle V-block work holding fixture of claim 2, wherein five of said seven side surfaces are provided with a central rectangular groove.

* * * * *